United States Patent [19]
Kapp

[11] 3,991,631
[45] Nov. 16, 1976

[54] WOVEN ENDLESS BELT OF A SPLICELESS AND MOBIUS STRIP CONSTRUCTION

[76] Inventor: J. Lehman Kapp, P.O. Box 522, Brevard, N.C. 28712

[22] Filed: Sept. 4, 1975

[21] Appl. No.: 610,314

[52] U.S. Cl. .......................................... 74/231 MB
[51] Int. Cl.² ........................................... F16G 1/00
[58] Field of Search ........... 74/231 MP, 231 R, 239, 74/237

[56] References Cited
UNITED STATES PATENTS

| | | | |
|---|---|---|---|
| 2,130,944 | 9/1938 | Bowen .................................. | 74/231 |
| 2,220,869 | 11/1940 | Wehner ................................. | 74/231 |
| 2,479,929 | 8/1949 | Harris ......................... | 74/231 MB X |
| 2,496,047 | 1/1950 | Goddard .................... | 74/231 MB X |
| 2,570,576 | 10/1951 | Lord ................................. | 74/231 R |
| 3,773,606 | 11/1973 | Worcester et al. .................. | 139/383 |

*Primary Examiner*—Leonard H. Gerin
*Attorney, Agent, or Firm*—Bell, Seltzer, Park & Gibson

[57] ABSTRACT

An endless belt is provided which is suitable for being rotated during use in various manufacturing and material handling operations and the like and is characterized by a construction having an increased surface and edge wear potential. The belt is a woven endless fabric strip of predetermined width and length which defines opposing outside and inside surfaces and lefthand and righthand edges and is of a spliceless and Mobius strip construction having a 180° turn in the surfaces thereof for providing in effect one spliceless continuous surface and one spliceless continuous edge of twice the predetermined length of the belt during rotation thereof by the inside surface reversing and becoming the outside surface and the lefthand edge reversing and becoming the righthand edge during each complete revolution of the belt. The belt has an interwoven warp and filling and the warp, preferably, is in the form of at least one continuous warp yarn wrapped generally in the form of a helix of the predetermined length and width of the belt and having a 180° turn at a given location along the length thereof.

3 Claims, 4 Drawing Figures

U.S. Patent        Nov. 16, 1976        3,991,631
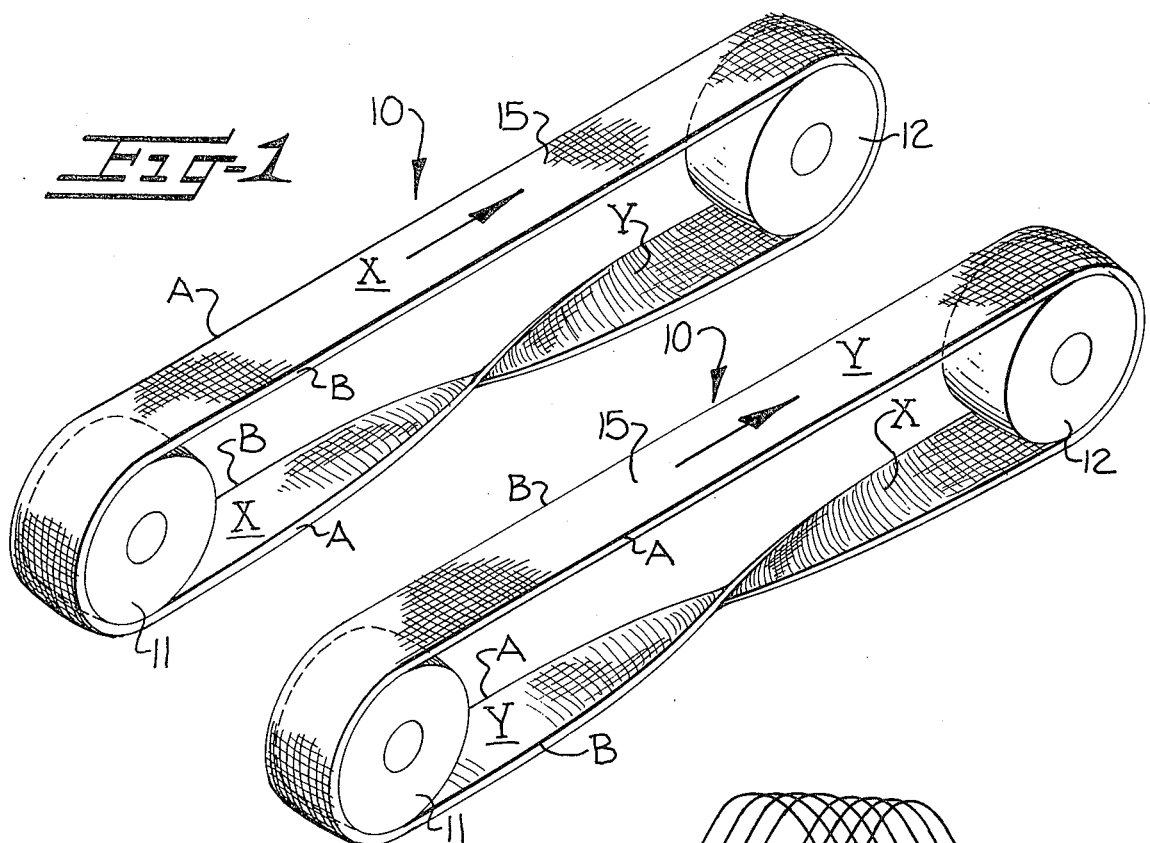
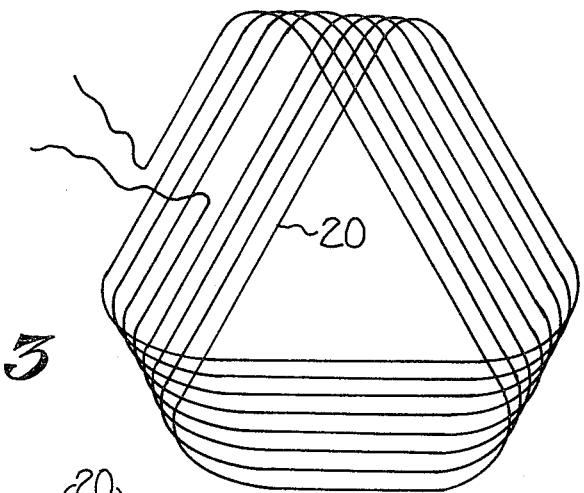
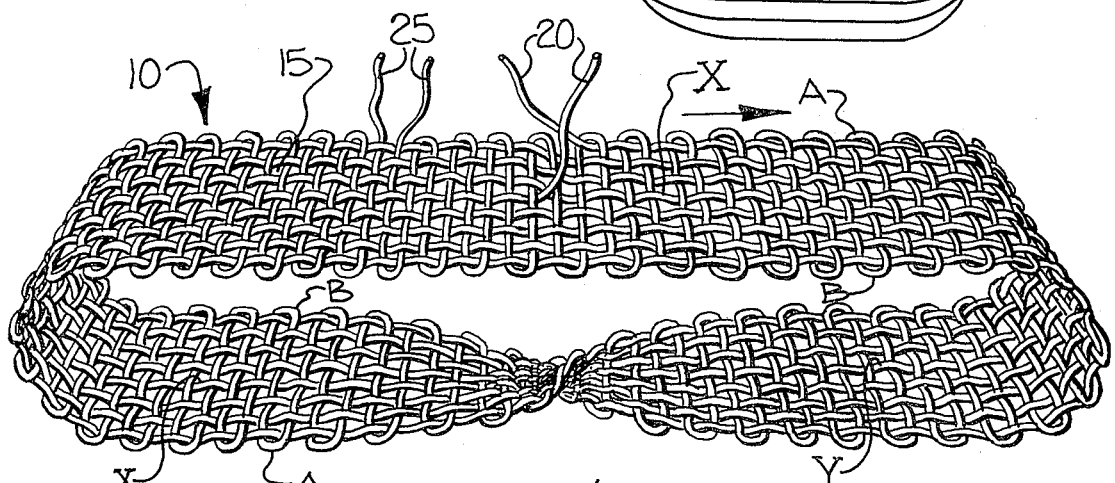

WOVEN ENDLESS BELT OF A SPLICELESS AND MOBIUS STRIP CONSTRUCTION

This invention is directed to a woven endless belt of a spliceless and Mobius strip construction for providing increased surface and edge wear potential.

BACKGROUND, OBJECT AND SUMMARY OF THE INVENTION

In many manufacturing and material handling operations, endless belts are utilized by being suspended over and around pulleys, rolls or the like and driven in various ways for performing desired operations. These belts have, for the most part, been constructed of a narrow fabric strip which is spliced or joined at its ends to form a continuous or endless belt. These belts are often subjected to concentrated wear on their outside surfaces or along either a righthand or lefthand edge due to friction or other wear factors concentrated therealong. Also, these belts are often subjected to unusual wear and failure at the splice or joint of the ends of the belt.

The problem of wear at the splice of the ends of the belt to form an endless belt has been combatted by the weaving of endless belts of a spliceless construction. Examples of such spliceless, endless, woven belts are set forth in U.S. Pat. Nos. 1,281,723; 2,672,168 and 2,672,169.

While these woven endless belts of spliceless constructions overcame problems of unusual wear and failure at the splice of the endless belts, these belts were still subjected to the surface and edge wear and, necessarily, had to be replaced in the manufacturing, material handling or other operations in which they were utilized at regular intervals.

Accordingly, it is the object of this invention to provide an improved endless belt construction which has an increased surface and edge wear potential and which eliminates a splice therein and overcomes wear at the splice of the belt.

By this invention, it has been found that the above object may be accomplished by providing an endless belt suitable for being rotated during use in various manufacturing and material handling operations and the like and which is characterized by a construction having an increased surface and edge wear potential, as follows. The belt comprises a woven endless fabric strip of predetermined width and length and defining opposing outside and inside surfaces and lefthand and righthand edges and which is of a (1) spliceless and (2) Mobius strip construction having a 180° turn in the surfaces thereof for providing in effect one spliceless continuous surface and one spliceless continuous edge of twice the predetermined length of the belt during rotation thereof by the inside surface reversing and becoming the outside surface and the lefthand edge reversing and becoming the righthand edge during each complete revolution of the belt.

A "Mobius strip", named after the German astronomer and geometer August Ferdinand Mobius (1790–1868), has fascinated mathematicians and parlor magicians for years. The Mobius strip is generally defined as a surface with only one side and one edge, made by placing a twist of 180° in a long rectangular strip and then securing the ends of the strip together.

This Mobius strip principle has been utilized or proposed for various applications including the formation of an endless belt or the like, as shown for example in U.S. Pat. Nos. 1,442,682; 2,479,929; 2,784,834 and 3,302,795. However, these previously proposed, Mobius strip, belts were all of the type which were spliced to make the belt endless and, therefore, retained the undesirable characteristic of having a splice or point of joinder in the endless belt which is subject to surface and edge wear.

A woven endless belt of both a (1) spliceless and (2) Mobius strip construction has not heretofore been proposed to applicant's knowledge.

BRIEF DESCRIPTION OF THE DRAWINGS

Some of the objects and advantages of this invention having been set forth, other objects and advantages will appear as the description proceeds, when taken in conjunction with the accompanying drawings, in which:

FIG. 1 is a perspective view of a belt constructed in accordance with this invention and suspended for rotation around a pair of pulleys or rollers;

FIG. 2 is a view, like FIG. 1, and illustrating the belt after it has been rotated one complete revolution;

FIG. 3 is a perspective, schematic view of a suitable warp which has been wound for weaving the woven belt of this invention; and FIG. 4 is a perspective view of a woven belt in accordance with this invention and showing the interwoven warp and filling thereof.

DESCRIPTION OF PREFERRED EMBODIMENT

Referring now to the drawings, there is shown an endless belt, generally indicated at 10, suitable for being rotated during use in various manufacturing and material handling operations and the like. The endless belt 10 would normally be suspended over and around a pair of pulleys or rollers 11, 12 for rotation in either direction, for example in a righthand direction as indicated by the arrows in FIGS. 1 and 2.

The endless belt 10 comprises a woven endless fabric strip 15 of predetermined width and length and which defines opposing outside and inside surfaces X and Y and lefthand and righthand edges A and B.

The endless belt 10 is of a spliceless and Mobius strip construction having a 180° turn in the surfaces X, Y for providing in effect one spliceless continuous surface and one spliceless continuous edge of twice the predetermined length of the belt during rotation thereof.

This principle may be seen by comparison of FIG. 1 and FIG. 2 wherein the respective orientation of surfaces X, Y and edges A, B have been shown after one complete revolution of the belt 10 from the position shown in FIG. 1 to the position shown in FIG. 2. For example, in the top flight of the endless belt 10 shown in FIG. 1, the outside surface is indicated at X and the inside surface at Y and the lefthand edge is indicated at A and the righthand edge is indicated at B. Referring to the lower flight of the belt 10 in FIG. 1 and the lefthand portion thereof, the inside surface Y reverses through the 180° turn to become surface X and the lefthand edge reverses to become edge B. Referring to FIG. 2, the opposite orientation of surfaces X, Y and edges A, B is shown in the belt after one complete revolution of the belt 10 as compared with the position shown in FIG. 1. Thus, with the belt 10 in the position illustrated in FIGS. 1 and 2, the top surface of the upper flight of the belt and the edge facing inwardly will alternate between surfaces X and Y and edges A and B as the belt is rotated and passes through the 180° turn in the surfaces thereof.

For constructing a woven endless fabric strip 15 of the spliceless and Mobius strip type, it has been specifically further found by this invention that it is desirable to provide a warp which includes at least one continuous warp yarn 20 (see FIG. 3) wrapped generally in the form of a helix of the predetermined length and width of the belt 10 and having a 180° turn at a given location along the length thereof, as illustrated at the top of the warp shown in FIG. 3. This warp may include a plurality of such wound warp yarns 20, but it has been found that at least one is desired.

The warp 20, as illustrated in FIG. 4, is interwoven with a filling 25 in a manner well known to those with ordinary skill in the art to form the interwoven warp and filling construction, as illustrated in FIG. 4. The ends of the warp 20 and filling 25 are shown loose in FIG. 4 for purposes of illustration only and these ends would be tucked into the fabric in a conventional manner.

It has been further found desirable to warp the warp yarn 20 to provide an even warp end count or side-by-side wraps of the warp yarn 20 at any given transverse section of the fabric strip 15 inasmuch as the Mobius strip orientation requires an even number of complete revolutions of the belt for the belt to return to its original surface and edge orientation.

Thus, this invention has provided a woven endless belt which provides increased surface and edge wear potential for use in various manufacturing and material handling or other operations by being constructed of both a spliceless and Mobius strip construction.

In the drawings and specification there has been set forth a preferred embodiment of the invention and, although specific terms are employed, they are used in a generic and descriptive sense only and not for purposes of limitation.

What is claimed is:

1. An endless belt suitable for being rotated during use in various manufacturing and material handling operations and the like and characterized by a construction having an increased surface and edge wear potential, said belt comprising a woven endless fabric strip of predetermined width and length and defining opposing outside and inside surfaces and lefthand and righthand edges and being of a spliceless and Mobius strip construction having a 180° turn in said surfaces thereof for providing in effect one spliceless continuous surface and one spliceless continuous edge of twice the predetermined length of said belt during rotation thereof by the inside surface reversing and becoming the outside surface and the lefthand edge reversing and becoming the righthand edge during each complete revolution of said belt.

2. An endless belt, as set forth in claim 1, in which said belt comprises an interwoven warp and filling and said warp consisting at least one continuous warp yarn wrapped generally in the form of a helix of the predetermined length and width of said belt and having a 180° turn at a given location along the length thereof.

3. An endless belt, as set forth in claim 2, in which said warp comprises an even number warp end count at any given transverse section therethrough.

* * * * *

UNITED STATES PATENT AND TRADEMARK OFFICE
CERTIFICATE OF CORRECTION

PATENT NO. : 3,991,631
DATED : November 16, 1976
INVENTOR(S) : J. Lehman Kapp

It is certified that error appears in the above-identified patent and that said Letters Patent are hereby corrected as shown below:

Column 4, Line 25, "consisting" should be --comprising--.

Signed and Sealed this

Eighth Day of March 1977

[SEAL]

Attest:

RUTH C. MASON
*Attesting Officer*

C. MARSHALL DANN
*Commissioner of Patents and Trademarks*